United States Patent [19]

Dagiel

[11] 4,324,443
[45] Apr. 13, 1982

[54] SEALED THRUST BEARING ASSEMBLY

[75] Inventor: Richard T. Dagiel, Elkgrove Village, Ill.

[73] Assignee: Aetna Bearing Company, Chicago, Ill.

[21] Appl. No.: 109,224

[22] Filed: Jan. 3, 1980

[51] Int. Cl.³ .............................................. F16C 33/78
[52] U.S. Cl. .................................. 308/187.1; 308/233
[58] Field of Search ................. 308/187.1, 233, 187.2, 308/230, 219, 36.2

[56] References Cited

U.S. PATENT DOCUMENTS

| 2,823,967 | 2/1958 | Harrington . | |
|---|---|---|---|
| 3,142,520 | 7/1964 | Mueller . | |
| 3,272,576 | 9/1966 | Greby . | |
| 3,343,894 | 9/1967 | Fisher . | |
| 3,346,307 | 10/1967 | Harrington . | |
| 3,361,503 | 1/1968 | Greby . | |
| 4,204,594 | 5/1980 | Banno | 308/187.1 |

Primary Examiner—Lenard A. Footland

Attorney, Agent, or Firm—Trexler, Bushnell & Wolters, Ltd.

[57] ABSTRACT

A sealed thrust bearing assembly includes a bearing member comprising spaced apart annular thrust rings with a plurality of bearing elements retained therebetween. An annular shell holds the spaced apart thrust rings in a fixed axial spaced relation with one another permitting relative rotation therebetween and about a common axis. A flat carrier plate extends transversely of this axis and has a generally circular through opening which receives a cylindrical carrier member adapted to engage both the opening and the inner diameter of the bearing member. An annular, elastomeric sealing member is interposed between the carrier plate and the facing surface of the bearing member. The cooperating structure of the carrier member positions the sealing member so as to form and maintain a seal about the surface of the bearing member facing the carrier plate, substantially without regard for variations in the axial spacing between the facing surfaces of the bearing member and the carrier plate.

8 Claims, 7 Drawing Figures

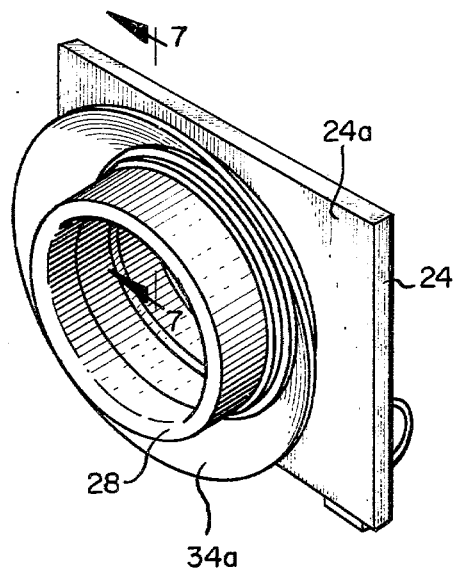
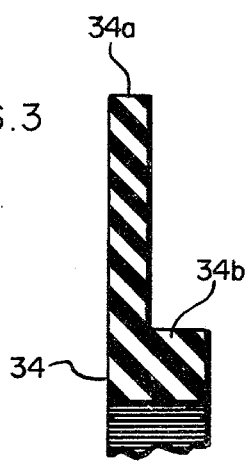
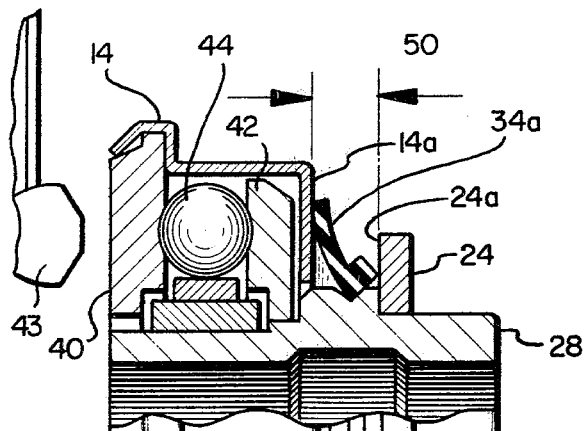
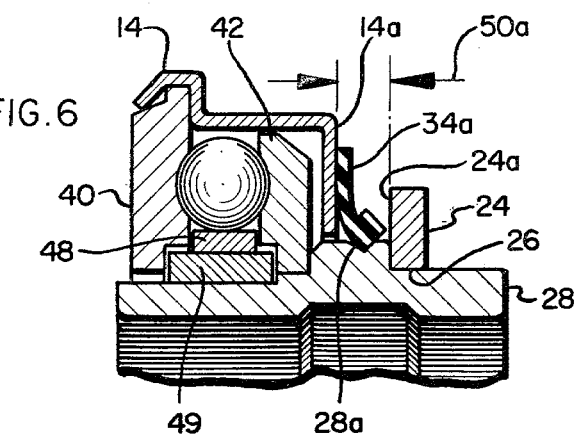
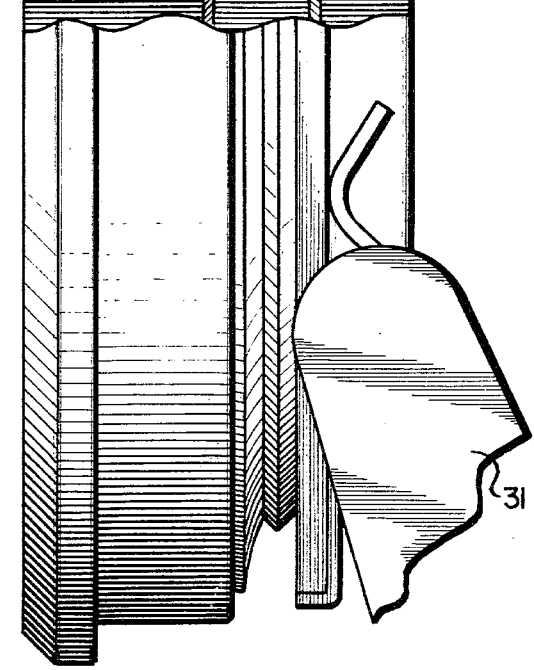
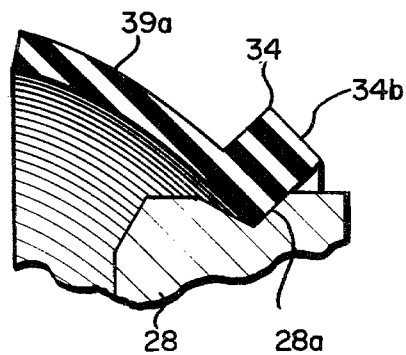

SEALED THRUST BEARING ASSEMBLY

BACKGROUND OF THE INVENTION

This invention relates generally to thrust bearings, and more particularly to a new and improved thrust bearing assembly which utilizes a novel sealing arrangement. The disclosed embodiment of the invention is directed to thrust bearing assemblies of the type used in automotive vehicles as clutch release or clutch throw-out bearings, although the invention is directed to other types of thrust bearings as well.

Generally speaking, clutch throw-out bearings provide a force-transmitting device between the foot-operated clutch pedal lever (or other clutch actuator) and other parts of the clutch assembly. Such clutch throw-out bearings are subjected to substantial forces and long periods of use, often under the rigors of adverse driving conditions. Accordingly, superior strength and durability are required to prevent premature failure of these bearings. One such clutch throw-out bearing assembly is disclosed and claimed, for example, in U.S. Pat. No. 3,909,086 issued Sept. 30, 1975.

One significant problem which arises with respect to such thrust bearings is that of maintaining adequate lubrication of the moving parts throughout a relatively long and rigorous service life of the bearing. For example, the rotation of the bearing while in service tends to cause migration of the grease or other lubricating agent outwardly of the bearing housing or "shell", thus hastening the demise of the bearing. Moreover, lack of adequate sealing invites loss of lubricant and contamination of the retained lubricant, which can also damage the bearing. Various sealing methods have been devised for such bearings and have proven generally satisfactory in operation; however, these sealing arrangements generally have required use of specially constructed seals. More specifically, the seal member is molded initially to a frusto conical configuration, such that during service the inherent resiliency of the seal will force it against the backside of the bearing. This is required to accommodate axial movement of the shell during operation as occasioned by dimensional tolerances and wear. Seals of this type, i.e. molded to a frusto conical shape, have disadvantages, in that they are expensive, and also tend to lose their resiliency during service. The present invention provides a seal member which is molded initially in a flat configuration, and is mounted in a stressed condition with only the forward edge of the base portion disposed in a mounting groove. Thus, the initially flat seal is "hoop stressed" to a frusto conical orientation, as necessary to accommodate shell movement. Further, this construction is less expensive to fabricate, and it is believed that improved service life will result.

OBJECTS AND SUMMARY OF THE INVENTION

Accordingly, it is an object of this invention to provide a new and improved bearing assembly which can be used as a clutch throw-out bearing or the like, and which has an improved sealing arrangement for the retention of internal lubricants and for the prevention of contamination thereof.

A related object is to provide a new and improved thrust bearing including an improved seal of the foregoing type, which further includes a sealing arrangement adapted to maintain the integrity of this seal substantially without regard either to variations in the relative spacing between the facing surfaces of the respective bearing and carrier plate or to changes in this spacing due to relative movement of parts, vibration, wear or the like, while in service.

BRIEF DESCRIPTION OF THE DRAWINGS

FIG. 3 is a fragmentary sectional view generally along the line 3—3 of FIG. 2, of one embodiment of a novel sealing ring member in accordance with the present invention;

FIG. 4 is a perspective view of a partially assembled thrust bearing assembly in accordance with the invention;

FIG. 5 is a side elevation, partially cut-away and partially in section along line 5—5 of FIG. 1, of a thrust bearing assembly in accordance with the present invention in use as a clutch throw-out bearing;

FIG. 6 is a partial side elevation, partially in section and similar to FIG. 5, illustrating features of the invention while in service; and, FIG. 7 is an enlarged fragmentary sectional view taken generally along the lines 7—7 of FIG. 4.

DETAILED DESCRIPTION OF THE ILLUSTRATED EMBODIMENT

Figure 1:
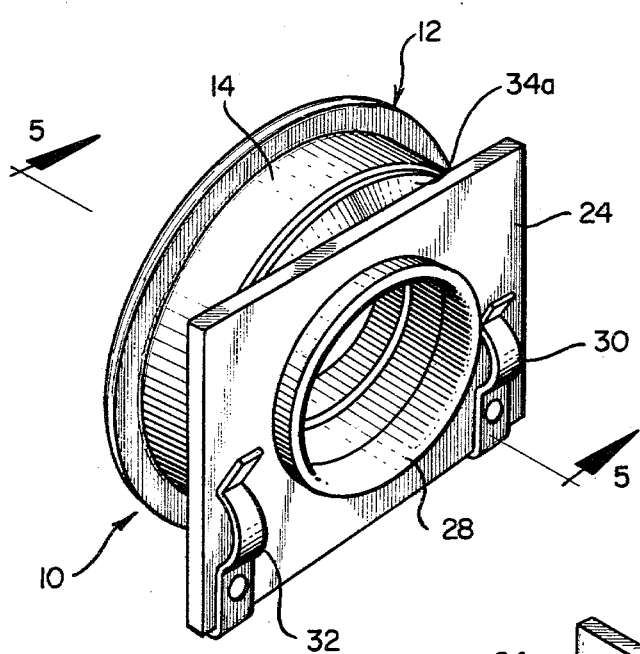
FIG. 1 is a perspective showing of a sealed thrust bearing assembly in accordance with the present invention.
Figure 2:
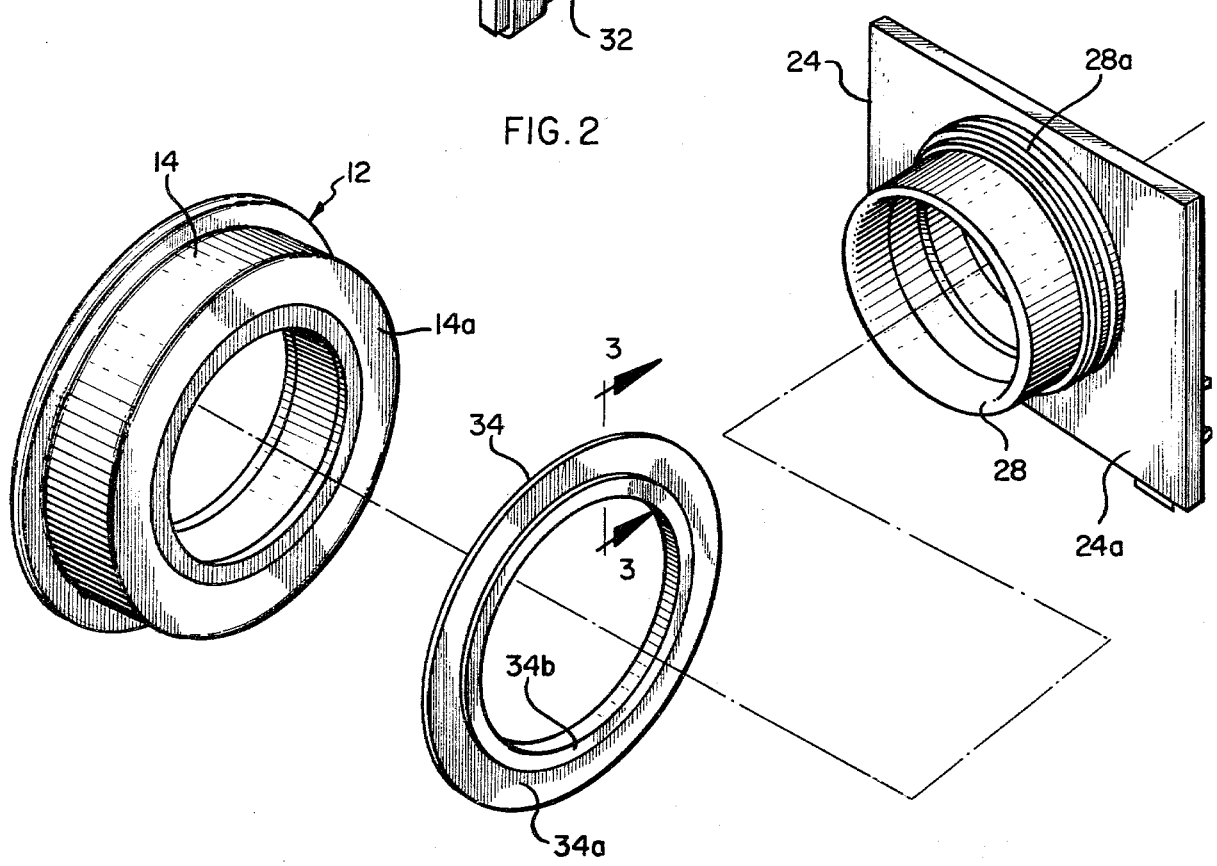
FIG. 2 is an exploded perspective view of the major components of the thrust bearing assembly of FIG. 1.

Reference is made to FIGS. 1 and 2, wherein the bearing assembly is of the type commonly used as a clutch throw-out bearing. The thrust bearing assembly is designated generally by the reference numeral 10 and includes a bearing member designated generally by the reference numeral 12. This bearing member is generally annular in configuration and has its outer periphery defined by a housing member or shell 14.

A carrier plate 24 comprises a generally flat, rectangular plate member provided with a substantially circular opening 26, through which is mounted a generally cylindrical, tubular carrier member 28. This cylindrical carrier member 28 is mounted in any suitable fashion to the carrier plate 24, as for example by staking. The carrier plate 24 is provided with a pair of clip members 30 and 32 for receiving a clutch fork assembly 31 (shown in FIG. 5) which provides the necessary axial movement of the thrust bearing assembly when used as a clutch throw-out bearing.

The length or axial extent and the outer diameter of the cylindrical, tubular carrier member 28 are suitable for receiving the bearing member 12 non-rotatably mounted thereon. Once so mounted, the bearing 12 may be secured to carrier 28 by suitable mechanical means such as staking.

In accordance with a feature of the invention, a generally annular sealing ring member 34, preferably of an elastomeric material is mounted over the cylindrical carrier member 28 so as to be interposed between the surface 24a of carrier plate 24 and an axially presented facing surface 14a of the shell 14. Advantageously, as will be described in detail hereinbelow, the structure of the carrier 28 and of the elastomeric sealing ring 34 is such that a highly reliable seal is provided thereby for the "back" or facing surface 14a of the bearing member 12.

Referring briefly to FIG. 3, the sealing ring 34, in the illustrated embodiment, is of a stepped configuration when viewed in cross-section. That is, when unstressed (flat) or unassembled with the carrier member 28, the cross-sectional configuration of ring 34 includes a first or lip portion 34a of a relatively larger outer diameter and a second portion 34b of relatively smaller outer diameter.

Reference is next invited to FIGS. 5 and 6, wherein the bearing assembly 10 is illustrated mounted upon a typical clutch throw-out assembly of an automotive vehicle. Conventionally, the bearing member 12 comprises a pair of spaced apart annular thrust rings 40 and 42 which retain a plurality of bearing elements 44 (ball or other bearing elements) therebetween. These thrust rings 40 and 42 are maintained in their assembled condition by means of the housing or shell member 14 which permits relative rotation between the thrust rings 40 and 42. Specifically, the shell 14 is attached or affixed for rotational movement in unison with the thrust ring 40, while it is spaced apart somewhat from the thrust ring 42. In practice, the thrust ring 40 and shell 14 are rotatable with respect to the remainder of the bearing assembly 10 in order to engage and rotate in unison with a plurality of rotating clutch release arms or fingers 43 (FIG. 5), in a well-known fashion. Hence the term "rotating ring" is used with respect to the ring 40 and "stationary ring" with respect to the ring 42. The stationary ring 42 is non-rotatably affixed to the cylindrical carrier 28, such as by staking or press-fitting. The rotating ring 40 is of somewhat greater inner diameter than is the ring 42. Also conventionally provided are a rotary bearing ring 48 and associated inner liner member 49, both of which are free to rotate relative to both thrust rings 40 and 42.

A novel sealing ring 34 of the invention is interposed between the face 14a of the bearing member 12 and the facing surface 24a of carrier plate 24. This sealing ring 34 and the carrier 28 cooperate to form the novel sealing arrangement of the present invention as will now be discussed in further detail.

Referring briefly to FIGS. 4 and 7, it will be seen that the sealing ring 34, when initially assembled with the carrier member 28, is prestressed so as to assume a generally frusto conical cross-section, as shown in FIG. 7. This is due primarily to the fact that the outer diameter of the seat portion 28a of carrier member 28 over which the sealing ring 34 is fitted is of a somewhat larger size than the inner diameter of the sealing ring 34. Consequently, the sealing ring 34 is hoop-stressed somewhat upon engagement over the carrier member 28 with only the leading or forward edge 35 of the base or second portion 34b disposed in the groove defining the seat 28a, which groove preferably includes a tapered wall, as shown. Thus, this stressing of the base portion 34b and the canting or biasing of the entire seal by the disposition of only the leading edge 35 of the base 34b in the groove 28a causes the lip portion 34a to assume a generally curvilinear, frusto conical cross-sectional shape, as seen in FIG. 7. In operation, with reference to FIGS. 5 and 6, it will be seen that the frusto-conical shape assumed by the sealing ring 34 with respect to carrier member 28, as well as the prestressing thereof serves to force and maintain the lip portion 34a in engagement with the back portion of the bearing assembly 12. This seal is maintained substantially without regard to spacing tolerances in the assembly of the bearing assembly 12 with the carrier member 28 or to changes in these tolerances while the bearing assembly 10 is in service. More specifically, it will be seen that the sealing ring 34 serves to effectively seal off the face 14a of the shell member 14 against leakage of the internal lubricants of the bearing member 12, substantially without regard to these variations in the position of the shell face 14a with respect to the carrier member 28 and/or carrier plate 24 due to manufacturing tolerances, or the like. When initially placed in service, this spacing, as indicated by the arrows 50a in FIG. 6, is generally such as to flex and deform sealing ring 34 somewhat so that the lip portion 34a is reversely curved from the initial position of FIG. 7. However, some variation in dimensions or in the relative spacing may be experienced about the relative peripheries of the facing surfaces 14a and 24a. Advantageously, the flexible or resilient nature of the sealing ring 34 and the prestressing thereof results in the maintenance of a relatively firm, sealing engagement between the sealing ring 34 and the face 14a of shell 14 about the respective peripheries thereof. Thus, the corresponding "back side" of the bearing 12 is sealed against the leakage or migration of lubricants therefrom as well as against entry of foreign materials which might contaminate the lubricant and/or the bearing.

Referring now to FIG. 5, in service, the relative alignment of the parts of the bearing 12 and/or the assembly 10 may vary somewhat due to the wear, vibration or the like. More specifically, the spacing between the faces 14a and 24a may change somewhat, as indicated by the somewhat larger spacing of arrows 50 as compared to the spacing at 50a in FIG. 5. This typically occurs due to some expansion of the bearing 12 in the horizontal direction as viewed in FIG. 5 and FIG. 6. The bearing rings 40 and 42 tend to become worn, loosening their engagement with the bearing elements or balls 44. For example, this may cause a shifting of the face 14a with respect to the facing surface 24a.

Surprisingly, however, this change in spacing does not adversely effect the integrity of the seal formed by the novel arrangement of the sealing ring 34 in conjunction with the carrier member 28. The sealing lip 34a may simply straighten out somewhat as shown in FIG. 5.

On the other hand, should the relative distance 50 between facing surfaces 14a and 24a for some reason tend to decrease somewhat while the bearing assembly 10 is in service, it will be seen that the sealing ring 34, still mounted in groove 28a of the carrier member 28, will tend to flex and maintain the seal.

While a preferred form of the invention is illustrated in the drawings and discussed above, it is not intended to limit the invention thereto. In this regard, it is contemplated that those skilled in the art may devise various modifications, without departing from the spirit and scope of the invention as defined in the claims appended hereto.

The invention is claimed as follows:

1. A sealed thrust bearing assembly, comprising: a bearing member comprising first and second spaced apart, oppositely disposed annular thrust rings, a plurality of bearing elements rotatably retained therebetween, a generally annular shell member for holding said spaced apart thrust rings in a fixed axial spaced relation to one another while permitting relative rotation therebetween about a common axis, a carrier plate having a face portion extending transversely of said axis and presented toward a facing surface of said shell, said plate having a generally circular opening, a generally cylindrical carrier member projecting through said opening and said bearing member to effectively hold the carrier plate and bearing member in assembled relation, a generally annular, elastomeric sealing member interposed between said face portion and said facing surface and being in sealing engagement with the facing surface and with the assembled carrier plate and carrier member, said sealing member being shaped to yield as the spacing of said face portion and said facing surface varies due to wear or the like while at the same time maintaining said sealing engagement.

2. A sealed thrust bearing assembly according to claim 1 wherein said sealing member comprises an annular member whose outer diameter defines a sealing surface that engages said facing surface.

3. A sealed thrust bearing according to claim 1 in which said carrier member has an annular groove between said face portion and said facing surface, said groove receiving an edge portion of the inner diameter of the sealing member when the sealing member is mounted in said groove and is hoop-stressed by said mounting to assume a generally conical configuration.

4. A sealing and bearing arrangement including a bearing member having a plurality of bearing elements rotatably retained between first and second spaced apart and oppositely disposed annular thrust rings, a shell member holding the thrust rings in fixed axial spaced relation to one another while permitting relative rotation therebetween about a common axis, a carrier plate having a face portion extending transversely of the axis through the bearing member and having a generally circular through opening, said carrier plate being axially spaced from said shell member, a generally cylindrical carrier member in said through opening, and means for holding the carrier plate and bearing member in assembled relation; a generally annular elastomeric sealing member for interposition between said carrier plate and a facing surface of the shell member, and means on said carrier member cooperating with said sealing member for maintaining the side of the bearing that faces the carrier plate substantially sealed against leakage or contamination of internal bearing lubricants substantially without regard to variations in the axial spacing between said carrier plate and said side, said sealing means being shaped to yield as said axial spacing varies.

5. A sealing and bearing arrangement according to claim 4 wherein said cooperating means on said carrier member includes a substantially annular seat portion of said carrier member of a greater diameter than the inner diameter of said sealing ring member and a generally annular circumferential groove on said seat portion also of greater diameter than said inner diameter and disposed for receiving an edge portion of the inner diameter of said sealing member when said sealing member is stretched over said seat portion, thereby elastically deforming said sealing member to define substantially a curved configuration.

6. A sealing and bearing arrangement including; a bearing assembly having an outer shell member; and a carrier member upon which said bearing assembly is mounted; a generally annular elastomeric sealing member including a radially inner base portion and a radially outer sealing lip portion, which sealing member is initially formed to a relatively flat configuration; an annular seat portion means on said carrier member with a groove means formed therein; said groove means and seat portion means being sized such that upon assembly of said sealing member, said radially inner base portion will be stretched with only the leading edge of said base portion disposed in said groove, thereby elastically deforming said sealing member to cause said sealing lip portion to assume a frusto-conical configuration, with said sealing lip portion engaging said shell member to seal against leakage of the bearing lubricant and being shaped to yield as said shell shifts axially relative to the seal due to wear or the like.

7. A sealing and bearing arrangement according to claim 6, wherein said groove means in the annular seat portion is of a V-shaped configuration.

8. A sealing and bearing arrangement according to claim 6 wherein said base portion has an axial, cross-sectional thickness greater than that of said sealing lip portion.

* * * * *